United States Patent [19]

Kurata et al.

[11] 4,442,460

[45] Apr. 10, 1984

[54] COPYING MACHINE

[75] Inventors: Masami Kurata; Fujio Moriguchi; Toshiharu Inui; Tomio Murayama, all of Kanagawa, Japan

[73] Assignee: Fuji Xerox Co., Ltd., Kanagawa, Japan

[21] Appl. No.: 329,466

[22] Filed: Dec. 10, 1981

[30] Foreign Application Priority Data

Dec. 10, 1980 [JP] Japan .............................. 55-174075
Dec. 10, 1980 [JP] Japan .............................. 55-174076

[51] Int. Cl.³ .......................................... H04M 1/22
[52] U.S. Cl. ..................................... 358/296; 358/293; 358/288; 358/287; 358/303; 358/304; 346/76 PH
[58] Field of Search ............... 358/287, 303, 304, 288, 358/256, 283, 298, 296, 293, 286; 346/76 PH

[56] References Cited

U.S. PATENT DOCUMENTS

| | | | |
|---|---|---|---|
| 2,776,366 | 1/1957 | Clauer | 358/303 |
| 3,566,022 | 2/1971 | Bishop et al. | 358/304 |
| 3,955,045 | 5/1976 | Ford, Jr. | 358/288 |
| 4,240,117 | 12/1980 | Wellendorf et al. | 358/293 |
| 4,303,936 | 12/1981 | Shaw | 358/287 |
| 4,329,071 | 5/1982 | Applegate et al. | 346/76 PH |

*Primary Examiner*—John C. Martin
*Assistant Examiner*—Edward L. Coles
*Attorney, Agent, or Firm*—Sughrue, Mion, Zinn, Macpeak and Seas

[57] ABSTRACT

A copying machine includes an optical sensor of the line scanning type for converting an image into electrical signals, and a thermal recording head controlled in accordance with the image signals. Either the platen or read unit are movable and the read unit will read in both forward and reverse directions of movement, and the magnification value can also be varied. The total width of energized heating elements and the movement length of the read unit or platen may be controlled in accordance with the size of the original. The total number of heating elements energized at any one time is limited, and the machine includes input and output terminals for sending image information externally and for receiving and recording image information other than directly from the read unit. A cutter is provided for cutting the recording paper web immediately prior to discharge.

23 Claims, 3 Drawing Figures

COPYING MACHINE

BACKGROUND OF THE INVENTION

The present invention relates to a copying machine, and more particularly to a copying machine for producing a number of copies from one original.

This application is related to concurrently filed and commonly assigned applications corresponding to U.S. applications Nos. 329,468 and 329,467.

Copying machines are classified into those using diazo photography, others using xerography, etc. In the diazo photography, however, only one copy is obtained from one original so that separate copying operations have to be carried out for a desired number of copies, and there is also a restriction that the original has to be transparent or semitransparent. In xerography, on the other hand, a number of copies can be produced from one original, and there is no restriction upon the original. Nevertheless, xerography has disadvantages that much power is required for fixing the developed image upon a sheet, that the heat of the fixer has to be shielded, and that the size of the system as a whole is enlarged.

SUMMARY OF THE INVENTION

It is, therefore, an object of the present invention to provide a small-sized multi-sheet copying machine which has a low power consumption rate and which has a simple construction.

In order to attain this object, the present invention provides a thermal recording type copying machine comprising: a platen for arranging an original thereon; a read unit made movable back and forth relative to said platen for reading the picture image information of the original and for converting it into electrical picture signals; a thermal recording head having heating elements for generating heat in accordance with said electric picture signals; means for conveying an ink donor member and web-shaped recording paper in juxtaposition to each other, while being in close contact under pressure, past the heating elements of said thermal recording head; and means for separating said ink donor member and said web-shaped recording paper after the recording operation to thereby discharge only the latter. According to this copying machine, the original information, which is placed upon the platen, is read out line by line and is converted into series picture image signals by the action of the image sensor, and those picture image signals are subjected to suitable picture image processing and are fed to the thermal recording head so that the leading end portion of this thermal recording head generates heat in accordance with those picture image signals. By this heat, the donor web, which is sandwiched between the thermal recording head and the web-shaped recording paper, is heated so that a pigment is melted out of said donor web until it sticks to the web-shaped recording paper. In this way, the original information is copied line by line onto the recording paper. The recording paper and the donor web are supplied from their respective supply rolls so that the image is formed by the thermal recording head. After that, the recording paper and the donor web are conveyed, while being in close contact, to an auto-cutter by a discharge roller so that they are cut until they drop into a discharge tray. On the other hand, the ink donor web is taken up on a take-up roll. In case a number of sheets are to be copied from one original, the image reading operations are performed in both the forward and backward strokes, and the image read out is recorded on the recording paper sheet by the action of the thermal recording head.

In a second embodiment, the read unit is maintained stationary while the platen carrying the original moves back and forth for the reading operation.

As a result of its advantageous operation, the present invention requires none of the photosensitive elements such as a drum or belt, which are one leading cause for enlarging the conventional system, such as a xerographic system, so that the system as a whole can have its size reduced. Moreover, since webs are used for the recording paper and for the ink donor, their feeding mechanism is simplied, and, since they are conveyed in close contact with each other until immediately before they are discharged, only one drive motor is sufficient for the feeding operation so that the system as a whole has its size further reduced. Still further, the present invention converts the picture image information of the original into electric signals and processes these electric signals so that it makes communication with an external device possible. Furthermore, the present invention provides the picture signal processor at the outside so that the system as a whole has its size further reduced and so that the composition, deletion and transfer of the picture image are made possible. In addition, since the image reading operations are performed in both the forward and backward strokes of the read unit, the present invention makes it possible to copy a number of sheets at a high speed.

In the present invention, it is preferred that an ink donor material for the copying operation be provided in a web shape and be conveyed from a supply roll to a take-up roll and that the platen can be swung upwardly so that the rolls can be take out of the copying machine for replacement. It is also preferred that the recording paper web be separated from the ink donor web and then cut to a predetermined length. It is also preferred that the copying machine have a white line skipping function, a quasi-signal generating function for reproduction of a half tone, a size enlarging and reducing function of the picture image, and so on.

The thermal recording head is composed of a number of heating resistor elements, which are grouped into blocks and controlled so that the size of the power source can be reduced. Especially when the black information of the picture image signals of one line exceeds a predetermined ratio, the number of the blocks can be increased to reduce the number of the elements in each block so that it becomes unnecessary to enlarge the power source. Also, the copying machine of the present invention is provided with means for rearranging the read data for recording in the backward stroke of the read unit or platen.

It is also preferred that the width and length of the original are detected thereby to control both the transmission of the picture image signals for one line and the lengthwise displacement of the platen or read unit.

BRIEF DESCRIPTION OF THE DRAWINGS

The present invention will now be described in more detail with reference to the accompanying drawings, in which.

DETAILED DESCRIPTION OF THE INVENTION

Figure 1:
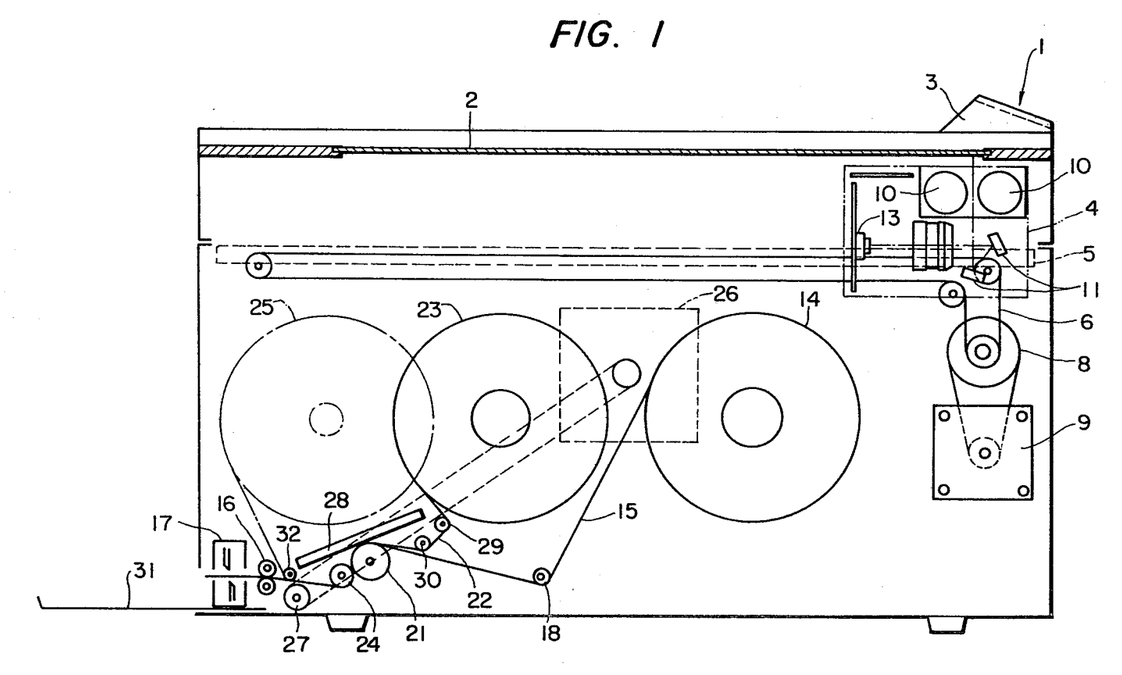
FIG. 1 is a schematic view showing the thermal recording type copying machine according to the present invention.

In FIG. 1, reference numeral 1 generally indicates one example of a copying machine, into which the features of the present invention are incorporated. At an upper portion of the copying machine 1, there are disposed both a platen 2 for arranging an original thereon and a platen cover 3 for protecting the platen 2, both of which are hinged to the frame of the copying machine. Below the platen 2, there is disposed a read unit 4 which is attached to a guide rail 5 such that it can move back and forth. For effecting these forward and backward movements of the read unit, there are provided a step motor 9 and a drive belt 6 so that the read unit 4 is moved by the drive of the step motor 9. As shown, there may be interposed a drive roller 8 between the step motor 9 and the drive belt 6.

The read unit 4 is composed of a pair of light sources 10, a pair of reflecting mirrors 11, a lens 12 and an image sensor 13. The light sources 10 are made to extend the width of the platen at a right angle with respect ot the moving direction of the read unit. The beams generated by those light sources 10 pass through the slits, which are formed at an upper protion of the read unit 4, and are reflected from the original which is arranged on the platen. The light is reflected in accordance with the image information of the original to generate an optical image. This optical image has its optical path changed by the mirrors 11 so that it enters the lens 12, and the lens 12 focuses the incident optical image upon the image sensor 13. This image sensor 13 is constructed of, for example, three juxtaposed arrays of 1024 photodiodes to thereby read out the information of one line having a width of 256 mm (i.e., the width of B4) with a resolution of 12 dots/mm. On the other hand, the image sensor 13 may use some other type of photoelectric converting element such as CCD. The picture image information of the original is fed consecutively line by line to the image sensor 13 until it is fed out as continuous picture image electric signals. These continuous picture image electric signals are fed to a thermal recording head through a suitable picture signal processing circuit or the like, as will be described hereinafter.

Inside of the copying machine, there is disposed a recording paper supply roll 14 so that web-shaped recording paper 15 is conveyed through an idler 18 into the nip between a thermal recording head 28 and a back roller 21. The web-shaped recording paper 15 thus conveyed is further conveyed together with an ink donor web 22 along the back roller 21. Then after recording, the web-shaped recording paper 15 and the ink donor web 22 pass through a feed roller 24, while being pressed into close contact with each other by the back roller, until they are fed to the discharge roller 16. The web-shaped recording paper and ink donor web are separated before they reach the discharge roller 16 so that the ink donor web 22 is taken up by the take-up roll through an idler 32 whereas the web-shaped recording paper 15 is conveyed through the discharge roller 16 to the auto-cutter 17.

The ink donor web 22 is prepared by applying a melting pigment to the side thereof which is to be brought into contact with the web-shaped recording paper 15. The donor web 22 thus prepared is supplied from a donor web supply roll 23 and passes along the circumference of the back roller 21 and around the donor web feed roller 24 until it extends to a donor web take-up roller 25. The taking-up operation of the ink donor web is performed by a recording step motor 26. More specifically, the drive force of the step motor 26 is transmitted through suitable means such as a belt to an idler 27. Since this idler 27 is coupled to the donor web feed roller 24 which is in contact with the back roller 21, the back roller 21 is stepwise driven.

At the opposite side of the ink donor web 22 from the side facing the back roller, the thermal recording head 28 is so arranged that it holds the ink donor web against the back roller. The thermal recording head 28 is formed into such a slender shaped that a number of heating elements are juxtaposed in a direction to intersect the moving direction of the donor web to thereby thermally record on the web-shaped recording paper 15 a line of information which has been read out by the image sensor 13. Since the simultaneous energization of those heating elements requires a power source having a large capacity, the heating elements are grouped into a predetermined number of blocks, and these blocks are energized so as to reduce the size of the power source. By way of example, the heating elements of 1728 dots can be grouped into four blocks at an interval of 6 to 8 dots/mm, each block having 432 dots, and the blocks can then be consecutively energized one at a time to thereby effect the image formation. This control of energization is easily performed by means of a diode matrix or the like. In the energization of the heating elements of the thermal recording head, moreover, the energization width is controlled in accordance with the width of the recording paper used to thereby eliminate waste in the power consumption and to prevent the detrimental transfer of ink to the back roller 21 in those portions where there is no recording paper between the donor web and back roller. Moreover, the ratio of the black information in one line to be recorded can be calculated, and, in case it exceeds a predetermined ratio (e.g., 25%), the aforementioned number of divided blocks is then increased (e.g., from four to eight or sixteen blocks) to thereby control the energization of the heating elements. Thus, the power source of the thermal recording head need not have its capacity increased even in the case of large sections of black information.

In the moving passage of the ink donor web, there are arranged both an automatic balancing roller 29 for smoothing the ink donor web and an idler 30 for holding constant the feed angle of the web-shaped recording paper. The idler 30 may preferably be arranged at a position for the ink donor web to make such an angle that the web-shaped recording paper 15 is smoothly fed to the back roller 21. The web-shaped recording paper 15 and the ink donor web 22 are conveyed together to the dischage roller 16 after the thermal recording operation. The ink donor web is then separated just upstream of the discharge roller and is taken up through the idler 32 by the take-up roll 25. This take-up roll 25 is equipped with a slip clutch to thereby slide and drive the take-up roll 25. On the other hand, the web-shaped recording paper is conveyed to the auto-cutter 17 by the discharge roller 16 so that it passes through that auto-cutter 17 until it is stopped while having its leading end protruding a predetermined length into the discharge tray 31. After that, the auto-cutter 17 operates to cut that recording paper to a predetermined length to thereby discharge the cut paper into the discharge tray 31.

The thermal recording head 28 and the rollers 29, 30 and 24 and preferably also rollers 27 and 32 are attached to a swing portion (not shown) which is turn is attached in a freely swinging manner to both the sides of the copying machine. Moreover, the platen 2 and the platen cover 3 are so hinged that they can be opened upward, as has been described. With the construction thus far described, in case the ink donor web is used up, the platen can be opened upwardly and the swing portion can be swung, whereby the used web supply roll can be taken out and replaced with a new one. On the other hand, the web-shaped recording paper supply roll 14 can also be simply replaced by opening the platen 2 and the platen cover 3 upwardly. When the web supply roll and recording paper supply roll are to be set, i.e. prepared for recording operation, their leading ends have to be brought into engagement with the feed roller 24 through the gap between the thermal recording head 28 and the back roller 21 to thereby finish the preparation for the recording operation.

Figure 2:
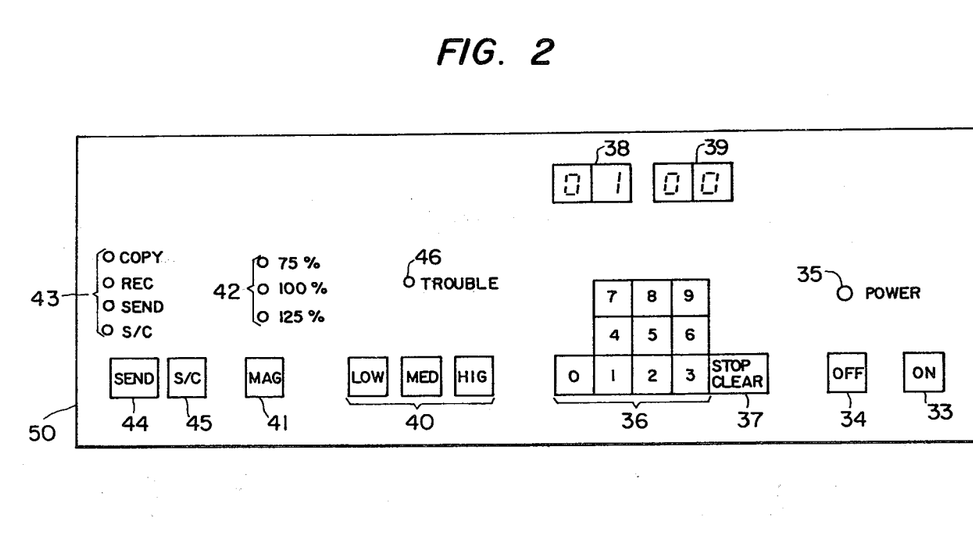
FIG. 2 is a schematic view showing the operation panel of the copying machine of FIG. 1.

FIG. 2 shows the operating panel 50 of the copying machine of FIG. 1. Reference numerals 33 and 34 indicate ON and OFF switches of the power source, respectively. When the ON switch 33 is depressed, a power indicator 35 is lit to inform the operator of the fact that the copying machine has been brought into an operative state. A copying number selecting button 36 is provided to set the desired copy number, and the set number is displayed in a set counter 38. In case a previously set copy number is to be changed, it is sufficient to depress a STOP CLEAR button 37 and to then again depress the copy number selecting button 36. In order to display the number of copies made, on the other hand, there is also provided an output counter 39. Buttons 40 are copy density selection and start switches, by which one of low (LOW), medium (MED) and high (HIG) densities is selected in accordance with the density of the original, these buttons also commencing the copying operation. In order to set the magnification of the copy, moreover, there is also provided a magnification setting button 41, which consecutively changes the magnification among 75%, 100% and 125%, each time it is depressed, upon which a magnification indicator 42 disposed thereabove is lit. A mode indicator 43 is also provided to display the mode of the copying machine and usually has only its COPY lamp lit to indicate that the usual copying operation is to be performed. Upon reception of a request signal from the outside, a REC lamp is lit and the picture image signal from the outside is received to form an image on the recording paper. A SEND button 44 is a transmission button for transmitting the picture image signal so that, if it is depressed, a SEND lamp is lit and the machine transmits the picture image signal, which has been read out by the image sensor, to the outside. An S/C button 45 is a button for simultaneously effecting the transmitting and copying operations so that, if it is depressed, a lamp S/C is lit and the machine feeds out the picture image signal which has been read out and also simultaneously forms on the recording paper an image of the picture image signal. An indicator 46 is lit when a malfunction such as jamming takes place in the copying machine, and is extinguished if the STOP CLEAR button is depressed after the malfunction has been repaired.

Figure 3:
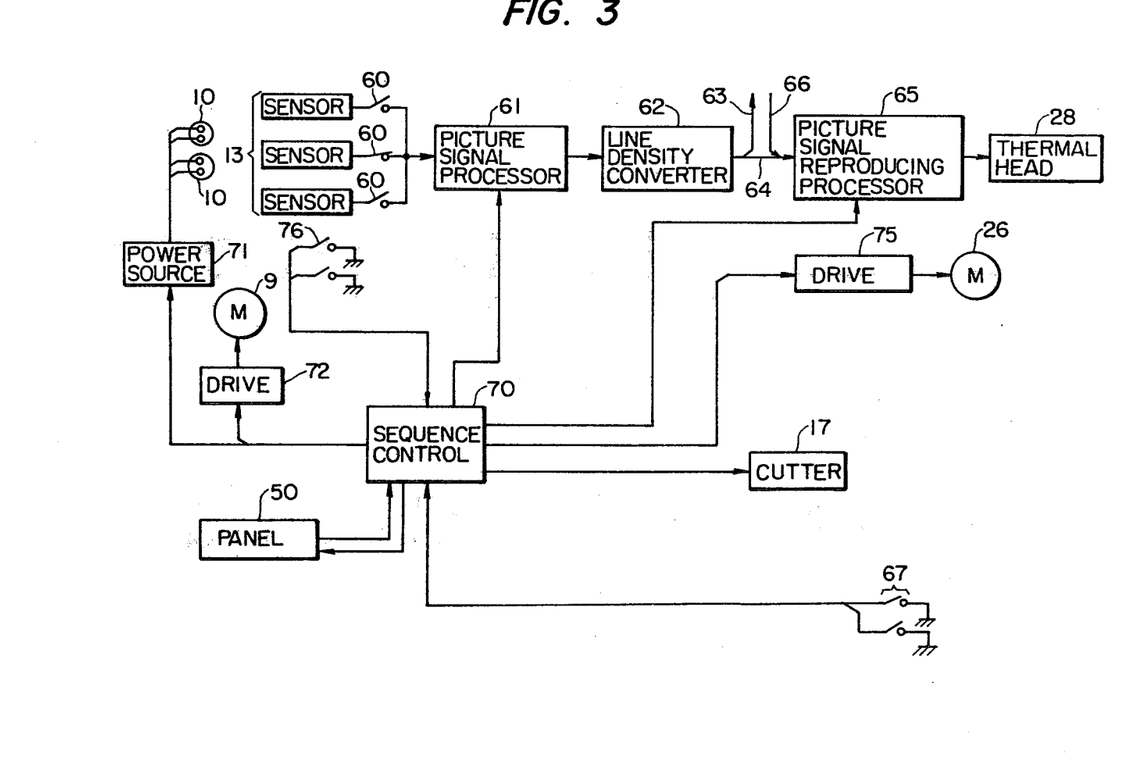
FIG. 3 is a block diagram showing the circuit of the copying machine of FIG. 1.

FIG. 3 is a circuit diagram of the copying machine of FIG. 1, and this circuit may be disposed either in the copying machine or in another casing for the purpose of size reduction. Reference numeral 13 indicates the image sensor shown in FIG. 1. In this circuit diagram, the image sensor is equipped with three blocks of light receiving elements, and switches 60, e.g. analog switches, are provided for consecutively switching those blocks. The series picture image signals, which are read out by the image sensor 13, are fed to a picture signal processing circuit 61. In this picture signal processing circuit, the picture image signals are filtered of noise (or the background) by compensating and processing the background and are then converted into binary signals of white and black. Moreover, that picture signal processing circuit is provided with a white line skipping function for skipping the reading of any line to be subsequently read in case that line is wholly white. For this white line skipping function, the image sensor 13 may preferably be equipped with an image receiving element which is operative to simultaneously read out at least two lines. Moreover, the picture signal processing circuit 61 is preferably equipped with a quasi-half tone signal generating circuit, which is operative to select a plurality of different threshold levels at the binary processing step of the picture image signals thereby to generate a quasi-half tone signal for generating a black point signal, thus making the half tone reproduction possible. The picture signal processing circuit may be the same as that described in said copending application No. 329,468.

The output of the picture signal processing circuit 61 is fed to a line density converter 62, which has a function to convert the picture image signals, which are read out with a resolution of 12 dots/mm by the image sensor 13, in accordance with the selected magnification. The conversion is made such that the 12 dots of read information are reduced to 8 dots of heat generating elements when the magnification is 100% (i.e., 1:1), such that the 12 dots are reduced to 6 dots when the magnification is 75% (i.g., a size reduction of ⅔), and such that the 12 dots are reduced to 10 dots when the magnification is 125% (i.e., a size enlargement of 5/4). The line density converter then feeds out the series binary picture signals.

The line density converter circuit 62 may be the same as that disclosed in said copending application 329,468.

These series binary picture signals can be transmitted to an external receiver as in a facsimile transmitter, and for this purpose an external transmission line 63 is provided. This line may be a telephone circuit, a communication circuit in a company, a radio or a connection line to an image composing or erasing device, for example. Independently of the line 63, the output of the line density converter 62 is directly connected through a line 64 to a picture signal reproducing processor 65. One or both of the lines 63 and 64 is selected in accordance with the mode of the copying machine such that no output is fed to the line 63 when the COPY lamp of the indicator 43 is lit, such that no output is fed to the line 64 when the SEND lamp is lit, and such that the output is fed simultaneously to the lines 63 and 64 when the S/C lamp is lit.

The picture signal reproducing processor 65 is equipped with a synchronizing signal generator similar to the facsimile receiver. As a result, the picture signal reproducing processor 65 can also receive picture image signals from an external line 66. The selection of those lines 64 and 66 is controlled in accordance with the mode of the copying machine similarly to the selection between the lines 63 and 64. For example, when the COPY lamp is lit, the line 64 is selected; when the REC lamp is lit, only the line 66 is selected; when the SEND lamp is lit, both the lines are disconnected; and when the S/C lamp is lit, only the line 64 is selected.

The picture signal reproducing processor 65 also has a function to rearrange the picture signal data in a manner to correspond to the scanning direction of the read unit. More specifically, the read unit 4 can move back and forth, as has been described hereinbefore, and it can read out the picture image signals not only during the forward movement but also during the backward movement in the present invention. Therefore, since, if the reading order during the forward movement is assumed to be forward one, the order during the backward movement is a backward one, it becomes necessary to rearrange the data for each line. The signal reproducing processor 65 performs this function. Needless to say, this function is peculiar to the backward scanning step and can be dispensed with during the forward scanning operation or when the data from the external line 66 is to be received. The picture signal reproducing processor 65 is also equipped with a series-parallel converter for converting the series picture signals into parallel signals, whereby the data for one line or for blocks in a line are prepared.

The picture signal reproducing processor 65 may be the same as that disclosed in said copending application No. 329,468.

In the vicinity of the cassette 14, there is provided a switch 67 for detecting the size (e.g., A4, B4 or the like) of the recording paper. There is also provided a circuit for controlling the recording width of the thermal recording head 28 in accordance with the signal of that switch 67. In the circuit 65, still moreover, there are included both a diode matrix for controlling the heating elements of the aforementioned head 28 block by block, and a block control circuit for increasing and decreasing the aforementioned number of blocks. As a result, the output of the picture signal reproducing processor selectively energizes the heating resistors of the thermal recording head 28 and heats the ink donor web 22 to thereby form the image on the web-shaped recording paper 15.

A circuit 70 is a sequence controller, which sequentially controls: a power source 70 for lighting the light sources 10 of the image read unit; a drive circuit 72 for energizing the read unit driving step motor 9; a drive circuit 75 for energizing the step motor 26, which is operative to drive the feed roller 24 and the back roller 21 through the idler 27; and the indicator of the panel 50, and which also controls the timing of the picture image signals of the picture sigal processing circuit 61. The sequence control circuit 70 controls the copying operations in response to both the command from the operating panel 50 and the signal coming from a detecting switch 76 for detecting whether or not the web-shaped recording paper, width detecting switch 67, the registration sensor 20 of the recording paper, and the read unit 4 are at their home positions.

As in said copending application No. 329,468, the sequence controller is quite simple and will preferably include a source of timing pulses as well as a microprocessor for controlling the sequence of operations.

The particular further details are simple design choices obvious to the ordinarily skilled artisan. These sequence controls will be made more apparent form the following description directed to the operations of the copying machine.

The operations of the copying machine of the present invention are as follows. It is assumed that the indicator of the operating panel has its COPY lamp lit. If one of the buttons 40 is depressed, the sequence control circuit 70 partly energizes the power source 71, after having confirmed that the copying machine is at its operative state i.e. that the paper supplies are prepared, etc.. If the machine is ready, the light sources 10 are energized as is the drive circuit 72 thereby to drive the step motor 9 so that the read unit 4 is set to its home position. Then, the sequence control circuit 70 confirms that the read unit is set at its home position by means of the switch 76. At this time, unless the signal from the switch 76 arrives for a predetermined time period, the copying machine is stopped, and the indicator 46 is lit to indicate trouble.

When the sequence control circuit 70 subsequently energizes the drive circuit 72, the read unit driving step motor 9 operates so that the read unit 4 is moved forward a length corresponding to the length of the original to stepwise scan the original, whereby the image sensor 13 of the read unit 4 reads out the original line by line. The picture image signals from that image sensor are fed through the circuits 61, 62 and 65 to the thermal recording head 28. Since the recording paper and the ink donor web have already been registered with each other, the step motor 26 operates to drive the back roller 21 through the feed roller 24, whereby they are stepwise fed out, thus starting the recording operation. In response to the picture image signals fed to the thermal recording head 28, the web-shaped recording paper 15 is recorded with the information for each line. The feed rate of the back roller 21 at this time is controlled in accordance with the copying magnification ratio, e.g. the correspondence between feed rates and magnification ratios may be 75%:100%:125%=3:4:5.

After a recording operation, the web-shaped recording paper 15 and the ink donor web 22 are conveyed in close contact to the discharge roller 16 by the action of the feed roller 24, but are separated from each other just upstream of the discharge roller so that only the recording paper passes through the discharge roller. Although not shown, a peeling device may be provided upstream of the cutter to facilitate separation of the recording paper web and ink donor web. The discharge roller 16 feeds out the leading end of the web-shaped recording paper 15 through the auto-cutter 17, which cuts the recording paper to determined lengths. After that, the recorded paper is stored in the discharge tray while the ink donor web is wound onto the take-up roll 25. In the case of a single-copy operation, the read unit is quickly returned to its home position. In the case of multiple-sheet copies, the copying operations are also performed in the backward stroke. Since, in this case, the direction read by the image sensor 13 is opposite to that in the case of the forward stroke, the data read by the image sensor 13 are recorded as an inverted image if they are fed out to the thermal recording head as they are. Therefore, this is corrected by the one-line data rearranging function of the picture signal reproducing processor 65, and the data are then recorded on the sheet. Incidentally, since the recording paper which has the image formed by the data read out in that backward stroke has its recorded image inverted from that of the recording paper in the forward stroke, a suitable direction changing device of the recording paper may preferably be disposed after the recording paper has been cut and upstream of the recording paper discharge tray.

Although the foregoing description is directed to the operations of the copying machine in the COPY mode, the remaining operating modes can be easily understood from that description. For example, in the REC mode, the image reading operation is not performed, but only the recording operation is performed; in the SEND mode, on the contrary, only the image reading operation is performed, and the picture image signals are simultaneously transmitted from the line 63.

Figure 4:
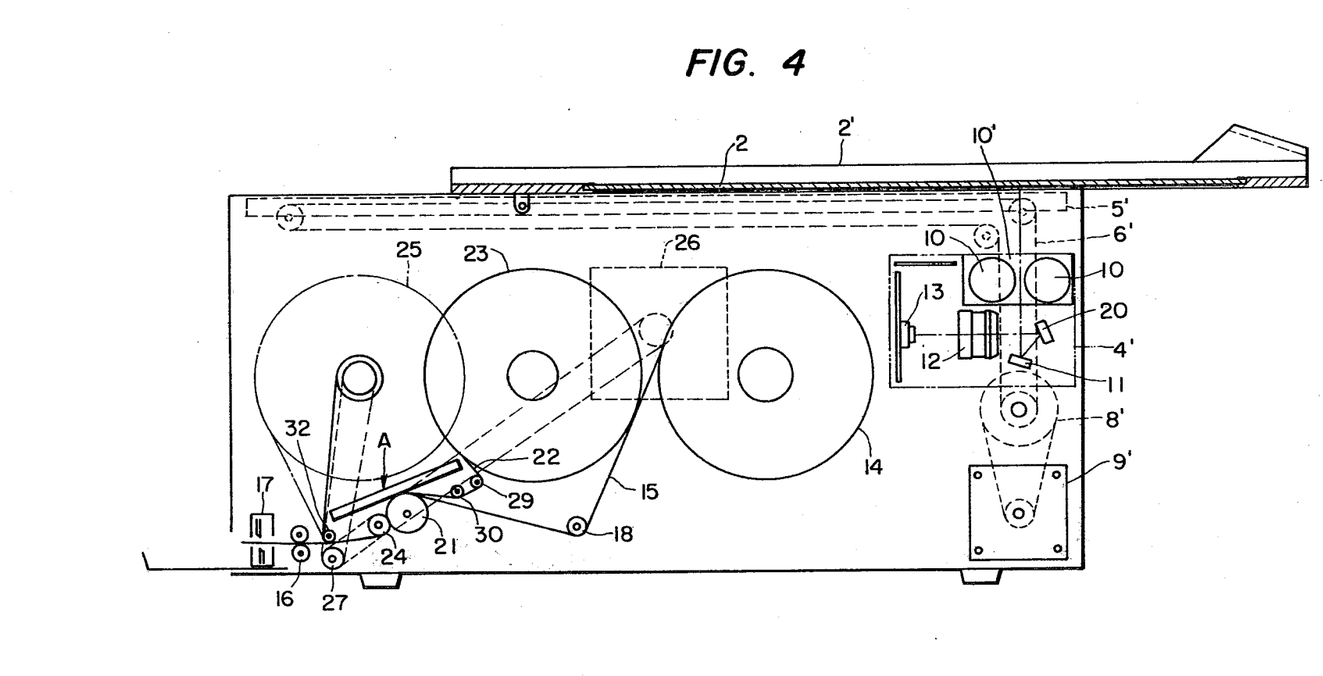
FIG. 4 is a schematic view showing a thermal recording type copying machine according to a second embodiment of this invention.

FIG. 4 schematically shows a copying machine according to a second embodiment of this invention which is quite similar to that of FIG. 1 but employs a movable platen rather than a movable read unit. As shown in FIG. 4, a platen 2 for arranging an original thereon is covered with a cover 2' and is arranged in a manner to move back and forth upon rails 5' which are mounted on both the sides of the upper portion of the copying machine. In order to effect the forward and backward movements of the platen 2, a step motor 9' and a drive belt 6' are provided so that the platen 11 is moved by the drive of the step motor 9'. As shown, there may be interposed a drive roller 8' between the step motor 9' and the drive belt 6'.

To one side of the copying machine, there is fixed an image read unit 4' which is formed with a slit-shaped opening 10' at its side facing the platen 2. The image read unit 4' is equipped with: a pair of light sources 10 for illuminating the original; a pair of mirrors 11 for changing the optical path of an optical image reflected by the original; a lens 12 for focusing the optical image; and an image sensor 13 for converting the focused optical image into electric signals including the picture image information. This image sensor 13 is constructed of, for example, three juxtaposed arrays of 1024 photodiodes to thereby read out the information of one line having a width of 256 mm (i.e., the width of B4) with a resolution of 12 dots/mm. Those numerical values and the types of the elements are presented merely by way of examples and may be larger or smaller in number. Moreover, the elements may instead be charge-coupled devices (CCD) or the like. In any event, the image sensor 13 is made operative to consecutively read out one line of information of the original at a time. Inside of the copying machine, there is detachably mounted a recording paper supply roll 14. The copying machine of FIG. 4 employs the same control circuitry of FIG. 3 and operates in an identical manner to the machine of FIG. 1 with the exception that the platen is moved instead of the read unit.

As will now be understood from the foregoing description, according to the present invention, there is provided a copying machine which makes it possible to copy a number of sheets although its power consumption rate is low and its construction is simple. Moreover, the copying machine can perform not only the copying operations but also the communication with an external device so that the composition, deletion, transfer and the like of a picture image can be performed. Still moreover, since a web is used as the recording paper, it is unnecessary to provide a device such as the registering roller, and this further contributes to reduction in the size of the system as a whole.

What is claimed is:

1. A thermal recording type copying machine, comprising:
    a platen for arranging an original thereon, said original having image information thereon;
    a read unit for reading the image information of the original during relative movement of said platen and read unit and for converting the read image into electrical picture signals;
    a stationary thermal recording head having heating elements for generating heat in accordance with said electrical picture
    an ink donor member stored in a first source;
    a continuous recording paper web stored in a second source;
    conveying means for conveying said ink donor member and said recording paper web in juxtaposition to each other from said first and second sources, while being in close contact under pressure, past said heating elements of said thermal recording head;
    means for taking up said ink donor member; and
    means for cutting only said recording paper and for discharging said cut recording paper from said machine.

2. A copying machine as set forth in claim 1, wherein said ink donor member comprises a web to be conveyed from a supply roll to a take-up roll.

3. A copying machine as set forth in claim 2, wherein said platen comprises a transparent plate which is movable to thereby expose the interior of said machine for replacement of said ink donor supply roll and take-up roll.

4. A copying machine as set forth in claim 1, further comprising picture signal processing means for converting said electrical picture signals into binary signals.

5. A copying machine as set forth in claim 1, wherein said image information is read line-by-line, said machine further comprising a processor for processing said electrical picture signals, said processor skipping the processing of any line of picture signals having no image information.

6. A copying machine as set forth in claim 1, further comprising means for effecting enlargement and reduction.

7. A copying machine as det forth in claim 6, wherein said read unit converts said image information into electrical picture signals with a resolution of X picture signal dots per mm of original image information and said heating elements are energized at a spacing of Y elements per mm, and said enlargement or reduction are effected by varying said spacing Y.

8. A copying machine as set forth in claim 1, further comprising an output terminal providing said electrical signals externally of said copying machine so that picture signal processing operations such as the composition or deletion of picture image portions may be performed externally of said copying machine, and input terminal means for receiving said externally processed signals for application to said thermal recording head.

9. A copying machine as set forth in claim 1, wherein said thermal recording head includes a plurality of blocks of heating elements and energizing means for energizing said heating elements, each said block including a plurality of heating elements, and wherein said energizing means energizes heating elements only within one of said blocks at any one time.

10. A copying machine as set forth in claim 9, wherein said energizing means varies the number of elements within each block in accordance with the density of said image information.

11. A copying machine as set forth in claim 1, further comprising means for determining the width of the original and means for controlling the total width of energized heating elements in accordance with the width of said original.

12. A copying machine as set forth in claim 1, wherein said copying machine has a variable magnification value, said conveying means conveying said ink donor member and paper sheet past said thermal recording head at a speed corresponding to said magnification value.

13. A copying machine as claimed in claim 4, wherein said picture signal processing means converts said electrical picture signals to digital signals by comparing said picture signals to threshold levels, said picture signal processing means selectively using a plurality of different threshold levels for achieving half-tone reproduction.

14. A copying machine as set forth in claim 1, wherein said read unit is movable and reads said image information during both backward and forward movements of said read unit, said machine further comprising a picture signal processor receiving said electrical picture signals and rearranging the picture signals derived during a backward stroke of said read unit in the copying operation of said copying machine, to thereby permit copying operation during both the forward and backward strokes.

15. A copying machine as set forth in either of claims 1 or 10, further comprising means for determining the size of said original and means for moving said read unit during a copying operation by an amount corresponding to the determined original size.

16. A copying machine as claimed in claim 1, wherein said platen is movable and said read unit reads said image information during both forward and backward movements of said platen with respect to said read unit, said machine further comprising a picture signal processor receiving said electrical picture signals and rearranging the picture signals derived during a backward stroke of said platen in the copying operation of said copying machine, to thereby permit copying operation during both the forward and backward strokes.

17. A copying machine as set forth in either of claims 1 or 10, further comprising means for determining the size of said original and means for moving said platen during a copying operation by an amount corresponding to the determined original size.

18. The copying machine as set forth in claim 5, wherein said processor provides a white line signal when no image information is produced by said read unit during the scanning of an entire line of said image information, said white line signal automatically causing said conveyor means to increment said cut paper by one line.

19. The copying machine as set forth in claim 7, wherein said electrical picture signals having a resolution of X picture signal dots/mm are converted into electrical picture processing signals having a resolution of Y picture signal dots/mm, said electrical picture processing signals being received by said thermal recording head to energize said heating elements.

20. The copying machine as set forth in claim 19, wherein said read unit includes a first shift register for converting said electrical picture signals into a parallel address signal, a ROM, said ROM receiving said parallel address signal and a selection signal to convert said parallel address signal into a parallel output signal, and a second shift register for converting said parallel output signal into said electrical picture processing signals.

21. The copying machine as set forth in claim 14, wherein said picture signal processor comprises a shift register, said shift register receiving said image information from said read unit and outputting said information in a first parallel form during a forward stroke of said read unit and outputting said information in a second parallel form during a backward stroke of said read unit, said first and second parallel forms being opposites of each other.

22. The copying machine as set forth in claim 21, further comprising a first RAM for storing said information from said shift register of said first parallel form, a second RAM for storing said information from said shift register of said second parallel form, a first data selector for reading out said first and second RAMs, said data selector reading out said first RAM during a backward stroke of said read unit and reading out said second RAM during a forward stroke of said read unit.

23. The copy machine as set forth in claim 22, further comprising a second data selector receiving the output of said first data selector, said second data selector separating said information to form a plurality of separate data groups.

* * * * *